United States Patent
Yamauchi et al.

(10) Patent No.: US 8,654,088 B2
(45) Date of Patent: Feb. 18, 2014

(54) DISPLAY, DISPLAY DRIVING METHOD, AND ELECTRONIC APPARATUS

(75) Inventors: Yuko Yamauchi, Tokyo (JP); Hiroshi Mizuhashi, Kanagawa (JP); Yoshiharu Nakajima, Kanagawa (JP); Tsutomu Tanaka, Kanagawa (JP); Shuji Hayashi, Kanagawa (JP); Takeo Koito, Kanagawa (JP)

(73) Assignee: Japan Display West Inc., Aichi (JP)

( * ) Notice: Subject to any disclaimer, the term of this patent is extended or adjusted under 35 U.S.C. 154(b) by 408 days.

(21) Appl. No.: 12/632,306

(22) Filed: Dec. 7, 2009

(65) Prior Publication Data

US 2010/0141598 A1  Jun. 10, 2010

(30) Foreign Application Priority Data

Dec. 9, 2008  (JP) ................. 2008-312846

(51) Int. Cl.
*G06F 3/041* (2006.01)
(52) U.S. Cl.
USPC ........................................ 345/173
(58) Field of Classification Search
USPC .................. 345/173, 174
See application file for complete search history.

(56) References Cited

U.S. PATENT DOCUMENTS

| | | | |
|---|---|---|---|
| 6,501,529 B1 | 12/2002 | Kurihara et al. | |
| 2003/0206149 A1* | 11/2003 | Yamashita et al. | 345/92 |
| 2005/0083319 A1* | 4/2005 | Kodate et al. | 345/204 |
| 2006/0214918 A1* | 9/2006 | Destura et al. | 345/173 |
| 2006/0262099 A1* | 11/2006 | Destura et al. | 345/173 |
| 2008/0238871 A1* | 10/2008 | Tam | 345/158 |
| 2009/0051634 A1* | 2/2009 | Chen | 345/87 |
| 2009/0160822 A1* | 6/2009 | Eguchi et al. | 345/174 |
| 2010/0001970 A1* | 1/2010 | Yamashita | 345/173 |

FOREIGN PATENT DOCUMENTS

| | | |
|---|---|---|
| JP | HEI 03-020817 A | 1/1991 |
| JP | 2001-075074 | 3/2001 |
| JP | 2007-503640 T | 2/2007 |
| JP | 2008-031633 A | 8/2008 |
| JP | 2008-217010 A | 9/2008 |
| JP | 2010-015051 A | 1/2010 |
| WO | 2005/020059 A2 | 3/2005 |

OTHER PUBLICATIONS

Japanese Patent Office, Office Action issued in Patent Application JP 2008-312846, on Nov. 24, 2010.

* cited by examiner

*Primary Examiner* — Nicholas Lee
(74) *Attorney, Agent, or Firm* — Dentons US LLP (57) ABSTRACT

A display includes: a display section having a plurality of pixels provided in a region where a first substrate and a second substrate are disposed opposite to each other; a switch provided in the region where the first substrate and the second substrate are disposed opposite to each other, the switch having two electrodes closed by a pressure from outside; a detecting section comparing a signal from the switch with a reference signal to determine whether the switch is closed or not; and a precharge section applying a precharge potential to a wiring in continuity with one of the electrodes of the switch prior to the detection at the detecting section.

11 Claims, 11 Drawing Sheets

DISPLAY, DISPLAY DRIVING METHOD, AND ELECTRONIC APPARATUS

BACKGROUND OF THE INVENTION

1. Field of the Invention

The present invention relates to a display having switches serving as touch sensors provided at a display section, a method of driving the display, and an electronic apparatus having the display.

2. Description of the Related Art

According to the related art, when coordinate detection is performed at a display unit to detect the position of a part of displayed content pointed by a press with a stylus or finger, a position detecting device externally attached to the display unit is primarily used. However, proposals suggesting integration of a position detecting device and a display have recently been made in an intention to satisfy demand for displays having higher image quality and higher definition to be used in mobile apparatus (for example, see JP-A-2001-75074 (Patent Document 1)).

SUMMARY OF THE INVENTION

When a display is provided with the function of sensors as thus described to obtain a sensor-integrated display capable of detecting the position of an input, problems occur as a result of incorporation of sensors at pixels of the display, although degradation of image quality or display quality can be kept less significant compared to that encountered when such position detecting devices are provided externally.

Specifically, when position detecting devices are incorporated in a display, electrodes and wirings for the detection elements must be disposed in the vicinity of display driving elements and wirings or electrodes for the driving elements. As a result, when the detection elements are driven, noise attributable to coupling or the like can occur at the display wirings. It therefore becomes necessary to perform an insulation process on the wirings or to dispose them at certain intervals, which can result in an increase in the number of manufacturing steps.

A problem can be similarly caused by noise coupling into detection wirings when driving is performed to display an image. Specifically, a detection circuit must operate taking noise coupling into detection wirings into account, and erroneous detection can otherwise occur.

A configuration has been proposed, in which wirings and electrodes for displaying an image are also used as wirings and electrodes for detection (Patent Document 1). In this case, however, the state of a wiring changes each time the wiring is driven for displaying an image, and it is therefore necessary to pay attention to the state of the wiring before detection.

Thus, it is desirable to allow position detection to be accurately carried out without being adversely affected by a driving signal for displaying an image even when sensors for position detection are incorporated in a display section.

According to an embodiment of the invention, there is provided a display including: a display section having a plurality of pixels provided in a region where a first substrate and a second substrate are disposed opposite to each other; a switch provided in the region where the first substrate and the second substrate are disposed opposite to each other, the switch having two electrodes closed by a pressure from outside; a detecting section comparing a signal from the switch with a reference signal to determine whether the switch is closed or not; and a precharge section applying a precharge potential to a wiring in continuity with one of the electrodes of the switch prior to the detection at the detecting section.

Since a precharge potential is applied to the wiring in continuity with one of the electrodes of the switch before detection is performed by the detecting section, an initial state of the potential at the switch can be clearly defined at the time of detection.

One of the electrodes of the switch is in continuity with a wiring of a transistor driving a pixel of the driving section, the wiring being in continuity of the pixel. The precharge potential applied by the precharge section may be a potential different from a common potential for displaying an image applied to the pixels. Alternatively, the precharge potential applied by the precharge section may be a potential which is opposite in phase to the common potential. One of the electrodes of the switch is in continuity with one electrode driving a pixel of the display section, and the other electrode of the switch is in continuity with another electrode driving the pixel. The switch is provided at a pixel of the display section.

According to another embodiment of the invention, there is provided a method of driving a display including a display section having a plurality of pixels provided in a region where a first substrate and a second substrate are disposed opposite to each other and a switch provided in the region where the first substrate and the second substrate are disposed opposite to each other, the switch having two electrodes closed by a pressure from outside. The method includes the steps of applying a precharge potential to a wiring in continuity with one of the electrodes of the switch before an on-period of a transistor driving each pixel and determining whether the switch is closed or not during the on-period of the transistor that follows the application of the precharge potential and before a video signal is supplied to the pixel.

Since the precharge potential is applied to the wiring in continuity with one of the electrodes of the switch before a predetermined period during which detection takes place at the switch, an initial state of the potential at the switch can be clearly defined at the time of detection.

The precharge potential applied by the precharge section may be a potential different from a common potential for displaying an image applied to the pixels. Alternatively, the precharge potential applied by the precharge section may be a potential which is opposite in phase to the common potential. The precharge potential is also used as a precharge potential applied to the pixel before a video signal is supplied to the pixel.

According to the embodiment, there is provided an electronic apparatus including a display. The display includes a display section having a plurality of pixels provided in a region where a first substrate and a second substrate are disposed opposite to each other; a switch provided in the region where the first substrate and the second substrate are disposed opposite to each other, the switch having two electrodes closed by a pressure from outside; a detecting section comparing a signal from the switch with a reference signal to determine whether the switch is closed or not; and a precharge section applying a precharge potential to a wiring in continuity with one of the electrodes of the switch prior to the detection at the detecting section.

Since the precharge potential is applied to the wiring in continuity with one of the electrodes of the switch before a predetermined period during which detection takes place at the switch, an initial state of the potential at the switch can be clearly defined at the time of detection.

According to the embodiments of the invention, the detection of position of an input can be accurately performed without being adversely affected by a driving signal for displaying an image even when sensors for position detection are incorporated in a display section.

DESCRIPTION OF THE PREFERRED EMBODIMENT

An embodiment of the invention will now be described with reference to the drawings.

[Display]

Figure 1:
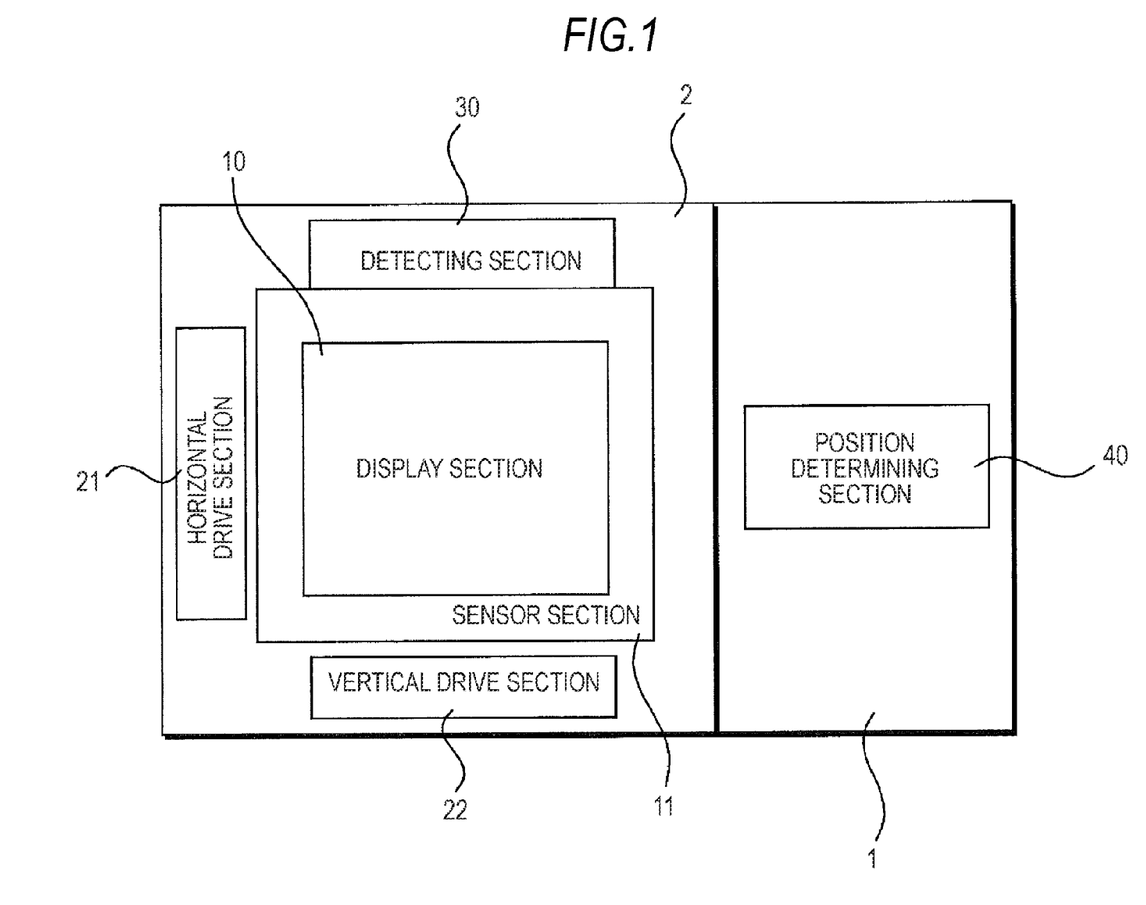
FIG. 1 is an illustration showing an exemplary configuration of a display according to an embodiment of the invention.

FIG. 1 is an illustration showing an exemplary configuration of a display according to the present embodiment. The display of the present embodiment includes a display section 10, a sensor section 11, a horizontal drive section 21, a vertical drive section 22, a detecting section 30, and a position determination section 40.

The display is a liquid crystal display having two substrates (a TFT substrate 1 and an opposite substrate 2) disposed opposite to each other and a liquid crystal layer held between the substrates. A plurality of gate lines and data lines are formed on one of the substrates (the TFT substrate 1), and a liquid crystal cell (pixel) is provided at each of intersections between the gate and data lines, the liquid crystal cell being accompanied by a selection element. The selection elements are driving transistors, and TFTs (thin film transistors) are primarily used as the driving transistors.

The display section 10 is a display area which is provided in a part of the region where the TFT substrate 1 and the opposite substrate 2 are disposed opposite to each other. The display section 10 includes the liquid crystal layer which is held between the substrates and in which the plurality of liquid crystal cells (pixels) are disposed in the form of a matrix.

The sensor section 11 is formed by switches, each having a sensor structure as will be described later, provided between the TFT substrate 1 and the opposite substrate 2. The switches may be provided at all pixels (liquid crystal cells). Alternatively, the switches may be provided at only some of the pixels as occasion demands. Still alternatively, the switches may be provided at the periphery of the display section 10. The present embodiment will be described on an assumption that the switches are provided at all pixels by way of example.

The horizontal drive section 21 drives the selection elements in the horizontal direction on a line-by-line basis for a predetermined period. The vertical drive section 22 drives the display section in the vertical direction. In the present embodiment, the section performs driving such that pixels associated with red (R), green (G), and blue (B) are sequentially selected in a horizontal scan period.

The detecting section 30 is a section for detecting the state of the switches having a sensor structure as will be described later at predetermined timing. Based on the state of the switches detected by the detecting section 30, the position determination section 40 makes a determination to obtain position information indicating switches which have been selected in the region of the display section 10.

In the present embodiment, detection electrodes provided to the TFT substrate 1 and the opposite substrate 2, respectively, at a predetermined interval from each other are used as a sensor structure. The two detection electrodes open and close to constitute a switch. As a result of the action of the switch, the two detection electrodes electrically close in response to a pressing force from outside (external input) to allow the external input to be detected. Therefore, the TFT substrate 1 includes at least one detection electrode and a detection wiring for detecting contact.

The other substrate (opposite substrate 2) has an electrode for displaying an image (common electrode), the other detection electrode used for detecting contact, and a wiring in continuity with the electrode.

Although not shown, the present embodiment includes a precharge section which applies a precharge potential to the wiring in continuity with one of the detection electrodes serving as a switch (detection wiring). The precharge section may be provided independently, and the section may alternatively be provided as a feature which is also used as, for example, the horizontal drive section 21.

The precharge section applies the precharge potential before a predetermined period during which the switch state is detected by the detecting section 30. For example, the precharge potential may be a potential which is different from a common potential applied to pixels to display an image. The precharge potential may alternatively be a potential which is opposite in phase to the common potential.

Figure 2A:
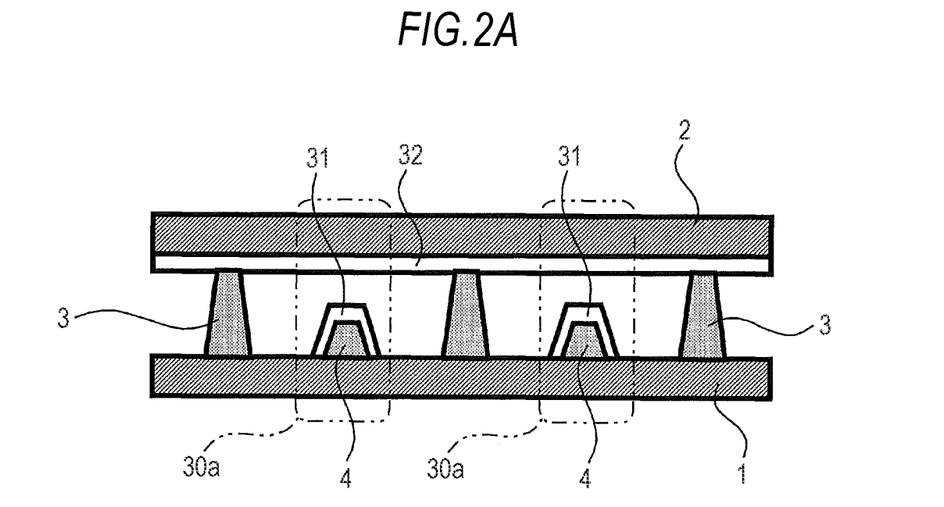
FIGS. 2A and 2B are sectional views showing a structure of a part of a display section.
Figure 2B:
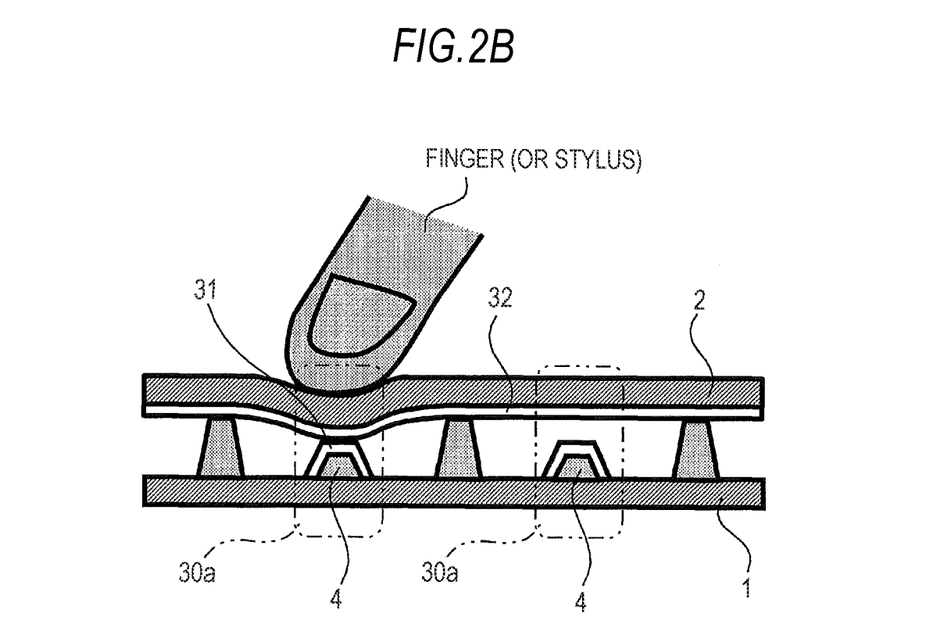

FIGS. 2A and 2B are illustrations showing a sectional structure of a part of the display section. As shown in FIG. 2A, the gap between the two substrates (the TFT substrate 1 and the opposite substrate 2) is defined by a plurality of columns (spacers) 3, and sensor structures (switches 30a) having a height equal to or smaller than the gap between the substrates are disposed between the columns.

In the example shown in FIG. 2A, the structures are formed by providing protrusions 4 made of the same material as the columns 3 and having a height lower than the columns 3 on the TFT substrate 1 and forming conductive films (detection electrodes 31 on one side) on the surface of the protrusions 4. A detection electrode 32 is formed on the other side or the opposite substrate 2. The detection electrode 32 on the other side also serves as a common electrode on the opposite substrate 2. Sensor structures (switches 30a) are formed by the detection electrodes 31 on the TFT substrate 1 and the detection electrode 32 on the opposite substrate 2. Normally, the sensor structures or switches 30a are kept open by the gap between the electrodes.

When there is an input from outside (external input) in the form of a pressing force applied by a finger or stylus as shown in FIG. 2B, the opposite substrate 2 is deflected by the pressing force, and the electrodes (electrodes 31 and 32) forming a sensor structure are put in contact with each other. Thus, a switch 30a is closed.

The switches 30a may be formed on either the TFT substrate 1 or the opposite substrate 2 instead of forming them using the detection electrodes 31 and 32 provided on both of the TFT substrate 1 and the opposite substrate 2. Either approach may be adopted as long as there is no continuity between the two types of detection electrodes when no external input is provided with a finger or stylus and there is continuity when an external input is provided. The switches 30a may be formed at all pixels, and the switches may alternatively be formed only at some of the pixels as occasion demands.

At least one of the electrodes of a sensor structure contacting each other is connected to the detecting section 30 through the detection wiring, and the detecting section 30 detects the value of a potential change or a current resulting from the contact between the plurality of electrodes or changes in such a value over time. In the present embodiment, at least either the detection wirings or the detection electrodes are precharged to a known voltage before the period in which they are driven for detection.

Figure 3:
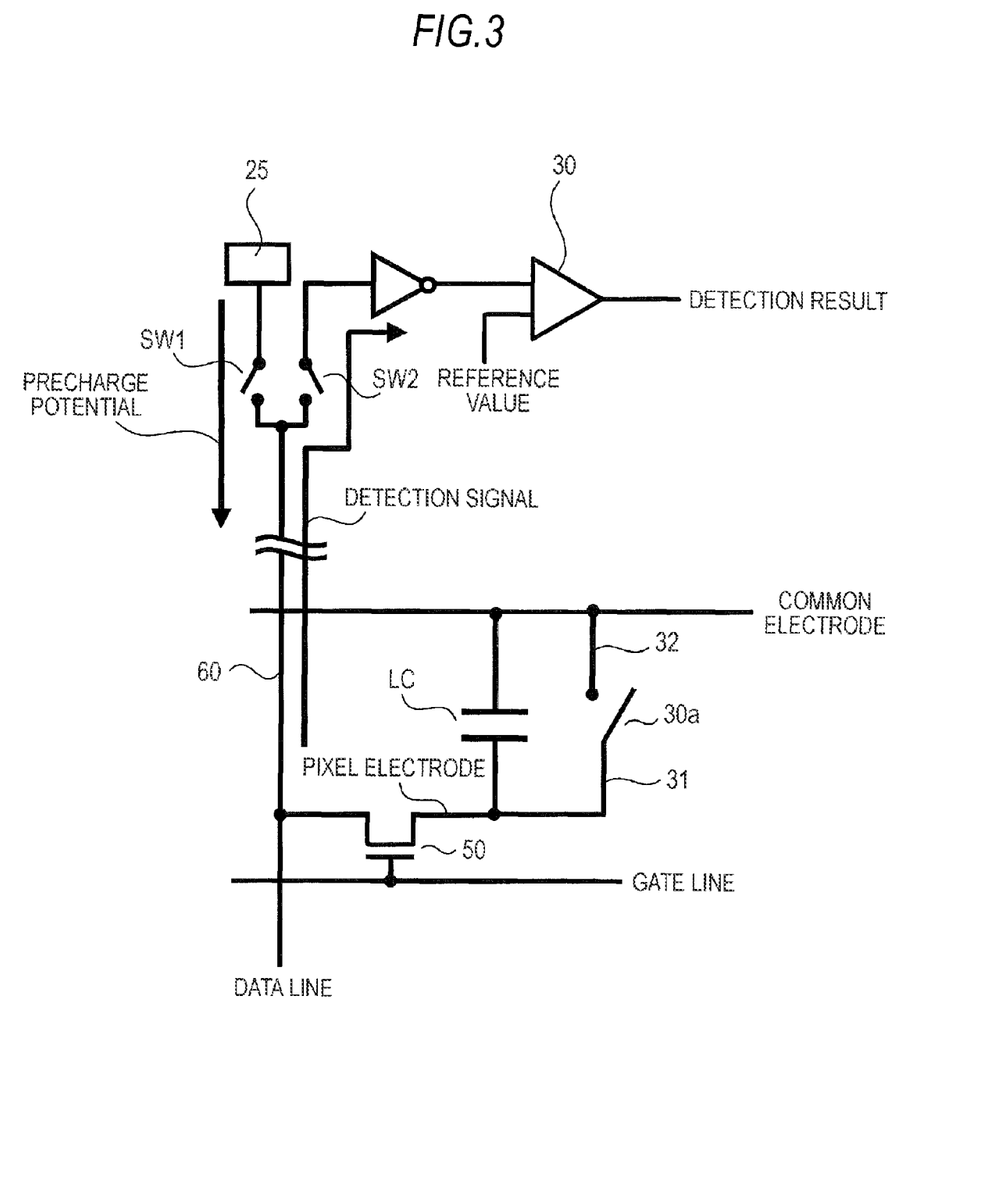
FIG. 3 is a circuit diagram of a structure of a display pixel including a sensor disposed therein.

FIG. 3 is a circuit diagram of a structure of a display pixel including a sensor disposed therein. In this example, a detection electrode 31, which is one of elements put in contact with each other by an external input, also serves a pixel electrode, and a detection electrode 32 or the other contacting element also serves as a common electrode on the opposite substrate. A detection wiring 60 also serves as a data line for supplying a video signal to a selection element (driving transistor) 50 of the pixel at which the detection electrode 31 is disposed. The selection element (driving transistor) 50 is provided at an intersection between the gate line and the data line to control driving of a pixel of a liquid crystal cell (LC).

One end of the detection wiring 60 extending to the detecting section 30 branches into a part which is connected to the precharge section 25 through a switch SW1 and another part which is connected to the detecting section 30 through a switch SW2. A precharge potential is applied to the detection wiring 60 with the switch SW1 in a closed state and the switch SW2 in an open state. Whether the switch 30a of the sensor structure is open or closed is determined by the detecting section 30 with the switch SW1 in an open state and the switch SW2 in a closed state.

For example, the detecting section 30 is constituted by a comparator which compares a detection signal transmitted through the detection wiring 60 with a predetermined reference value and outputs a detection result. When it is determined that the switch 30a is closed from the detection result, it means that the position of the pixel including the switch 30a disposed therein has been selected. Thus, the position determination section 40 shown in FIG. 1 determines a position selected on the display section 10 based on the state of the switches 30a according to such detection results and the positions of the pixels where the switches 30a are provided.

[Method of Driving the Display]

Figure 4:
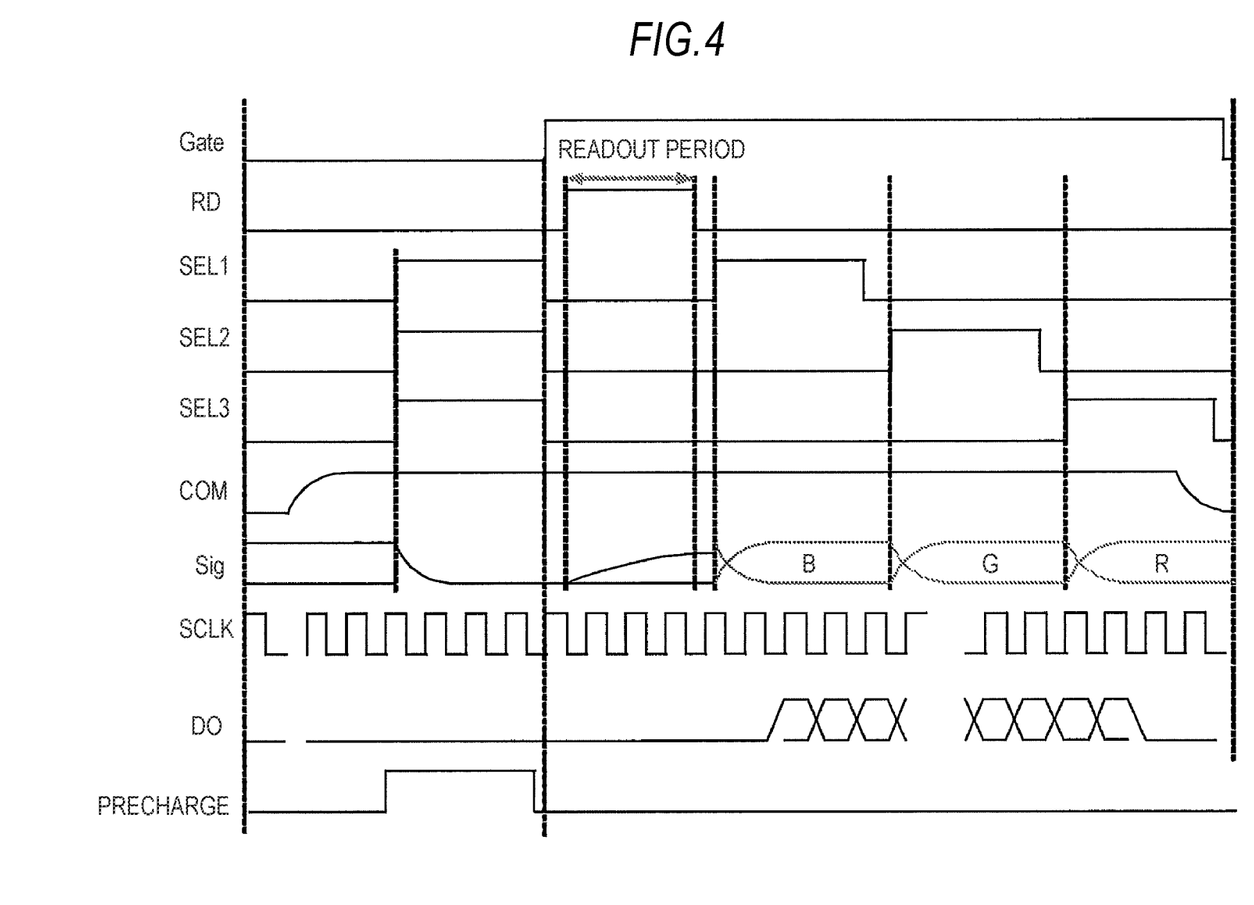
FIG. 4 is a timing chart for explaining a method of driving the display according to the embodiment.

FIG. 4 is a timing chart for explaining a method of driving the display according to the present embodiment. The timing chart shows various kinds of timing within one horizontal scan period. In FIG. 4, "Gate" represents timing for driving the selection elements (driving transistors) of pixels in the horizontal direction; "RD" represents timing for detection by the detecting section; and "SEL1", "SEL2" and "SEL3" represent timing for driving selectors associated with blue (B), green (G), and red (R), respectively.

Further, "COM" represents timing for applying a voltage to the common electrode; "Sig" represents timing of R, G, and B video signals; "SCLK" represents a clock; "DO" represents timing of a video data signal; and "Precharge" represents timing for precharging the wiring (detection wiring) in continuity with one of the detection electrodes of a sensor structure (switch) as described above.

When the selection elements (driving transistors) are turned on at the timing shown in FIG. 4, a display voltage is written in the relevant pixel electrodes. Meanwhile, the selectors SEL1 to SEL3 are sequentially turned on to select pixels associated with blue (B), pixels associated with green (G), and pixels associated with red (R) sequentially, and video signals Sig are written in respective pixels.

In the present embodiment, the data lines (detection wirings) are charged to a potential different from a common potential, e.g., a potential XVCOM which is opposite in phase to the common potential before the time at which the selection elements (driving transistors) of pixels having a sensor structure are turned on. Thereafter, the data lines (detection wirings) are floated to provide a detection period (period for reading results of detection) in the first half of the period in which the selection elements are on. The second half of the on-period of the selection elements constitutes a period for writing the display voltage in the pixel electrodes.

During the detection period, the state of the switch of a sensor structure is determined from the potential at one of the detection electrodes forming the switch. Specifically, when the plurality of detection electrodes forming the switch are in contact with each other, the pixel electrode in continuity with one of the electrodes of the switch is shorted with the common electrode on the opposite substrate. Since the detection wiring is floated, the common potential is detected through the detection wiring during the on-period of the selection element.

An input in the form of an external pressure may be determined by detecting the common potential, and determination may alternatively be made by setting a threshold for determination using the precharge potential.

The detection method utilizing the pixel electrodes has at least two potential problems. First, when at lest one detection electrode is in contact with another as a result of an input from outside, the pixel electrode always has the same potential as that of the other electrode in contact as long as the electrodes are kept in contact. Therefore, proper display of an image may be hindered according to this method. Second, a pixel potential written in a pixel electrode at the previous timing for writing can affect the detection of the state of the switch at that pixel, which can induce erroneous detection when there is no external input.

Referring to the first problem, image quality at the displaying pixel is not a problem because the external input element (a finger or stylus) is present at that pixel while the external input is provided. For the second problem, precharging performed before detection according to the embodiment will work as an effective countermeasure.

Specifically, when a detection wiring is precharged before detection, it is possible to minimize the influence of a pixel potential written at the previous timing, e.g., the influence of a residual potential on the data line which also serves as the detection wiring. Further, a threshold for detection can be set based on the precharge potential.

Figure 5:
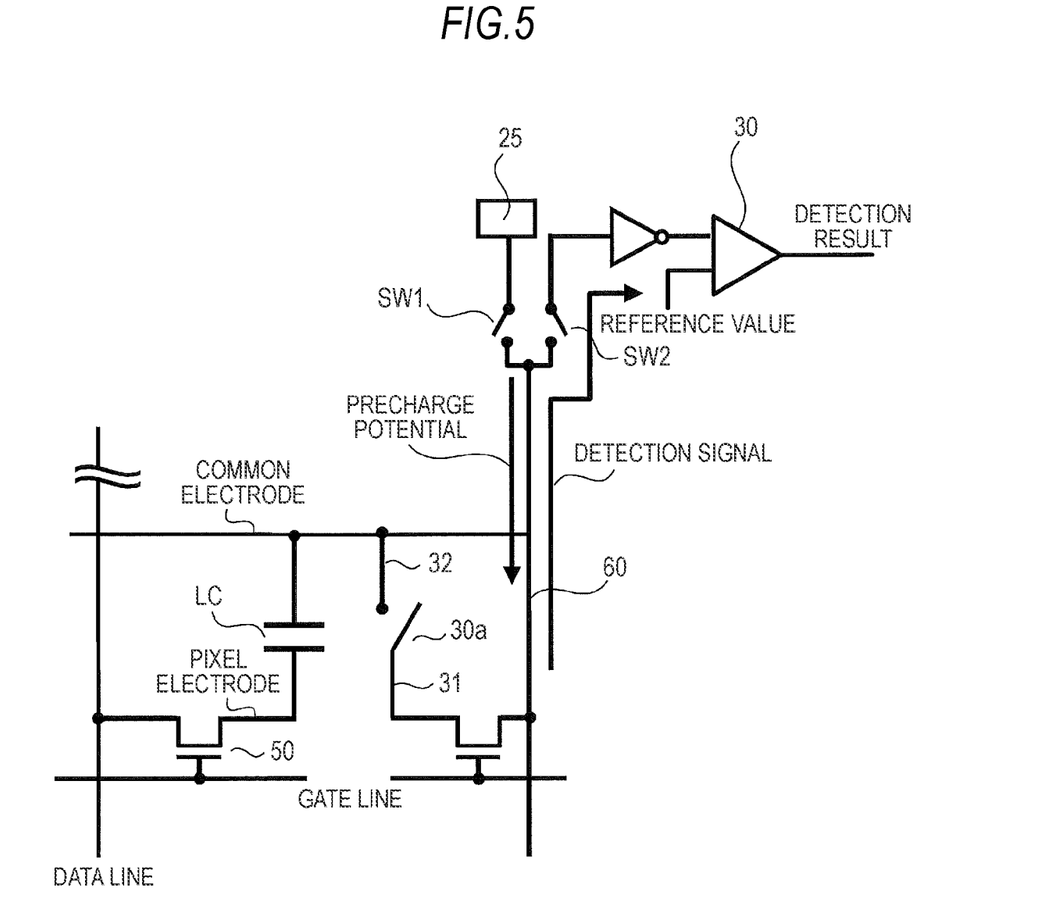
FIG. 5 is a circuit diagram of a structure in which detection electrodes and detection wirings are provided separately.

The wirings and electrodes used for displaying an image may also serve as wirings and electrodes for detection. Alternatively, some or all of those wiring and electrodes may be exclusively used for displaying an image. FIG. 5 shows a configuration in which detection electrodes are not used as pixel electrodes and in which detection wirings are also separate from data lines.

In the configuration shown in FIG. 5, a selection element (driving transistor) 50 is provided at an intersection between a gate line and a data line to control driving of a pixel of a liquid crystal cell (LC). A switch 30a is disposed between a common electrode and a detection wiring 60. A detection electrode 31 on one side of the switch 30a is connected to the detection wiring 60 through the transistor which is controlled through the gate line, and a detection electrode 32 on the other side of the switch is connected to the common electrode.

In this example, the detection wiring 60 and the data line are provided separately. One end of the detection wiring 60 is branched, and one of the branches is connected to a precharge section 25 through a switch SW1, and the other branch is connected to a detecting section 30 through a switch SW2. A precharge potential is applied to the detection wiring when the switch SW1 is closed and the switch SW2 is open. When the switch SW1 is open with the switch SW2 closed, the state of the switch 30a having a sensor structure can be detected by the detecting section 30.

In such a configuration, since the detection wiring 60 is precharged before detection, a readout can be carried out with stability as described above regardless of whether the detection takes place in synchronism with timing for driving the liquid crystal cell or not.

In the present embodiment, one of detection electrodes of a switch having a sensor structure also serves as a common electrode on an opposite substrate. As a result, one side of the plurality of detection electrodes can be always set at a common potential at all pixels, and a threshold for detection can therefore be set by associating the common potential with a known potential to be reached by the precharging prior to detection.

Some driving methods require neither electrode nor wiring to be provided on the opposite substrate for displaying an image depending on the liquid crystal used, for example, when an in-plane witching liquid crystal or a fringe field switching liquid crystal is used. In the present embodiment, a detection electrode must be provided on the opposite substrate even when such a driving method is employed. It is desirable to provide a common electrode on the opposite substrate to use the present embodiment effectively.

A description will now be made on an exemplary structure to be used for a liquid crystal requiring no common electrode on the opposite substrate for displaying an image, i.e., a structure in which a common electrode to be put in continuity with detection electrodes is provided on the opposite substrate. In the case of a structure having a common electrode for displaying an image provided on the opposite substrate, limitations will be placed on the disposition of the detection electrodes by the common electrode. On the contrary, it is assumed that there will be no such limitation when the opposite substrate has no common electrode for displaying an image.

However, when an electrode is present directly above a display liquid crystal cell, the alignment of the liquid crystal will be disturbed, which can affect optical characteristics such as transmittance and brightness of the display. Therefore, a detection electrode is disposed on the opposite substrate such that it will not be located directly above a display liquid crystal cell.

Even when a detection electrode is disposed so as not to lie directly above a display cell, the alignment of the liquid crystal will be disturbed in the vicinity of the electrode by a voltage applied to the electrode. In order to minimize the influence of such disturbance to alignment on display of an image, adjustment of the width and position of the wiring is carried out along with a light blocking process for the same, and a voltage applied to the detection electrode disposed on the opposite substrate is adjusted. For example, instead of forming a detection electrode throughout the opposite substrate, patterning may be carried out to provide the detection electrode in such a position that the influence on liquid crystal alignment can be minimized.

It is desirable that the voltage applied to the detection electrode is as close as possible to the common potential when optical characteristics are considered. For example, the voltage is preferably set equal to the common potential or at the common potential plus or minus 0.5 V or less.

A description will now be made on the precharge potential applied to the detection wiring. In the present embodiment, the presence of an external input made by a finger or stylus is determined or detected using a plurality of electrodes contacting each other, and one of the detection electrodes in contact with each other is set equal to a common potential. In this case, a common electrode may serve also as a detection electrode, and those electrodes may alternatively be provided separately.

The detection wiring is precharged to enable detection using a potential which is opposite in phase to the common potential (a potential XVCOM). The present embodiment employs a system in which a plurality of detection electrodes are put in contact with each other by an external input, and the contact is detected when the detection wiring is consequently charged to the common potential. Therefore, a potential different from the potential VCOM is used as the precharge potential.

Figure 6A:
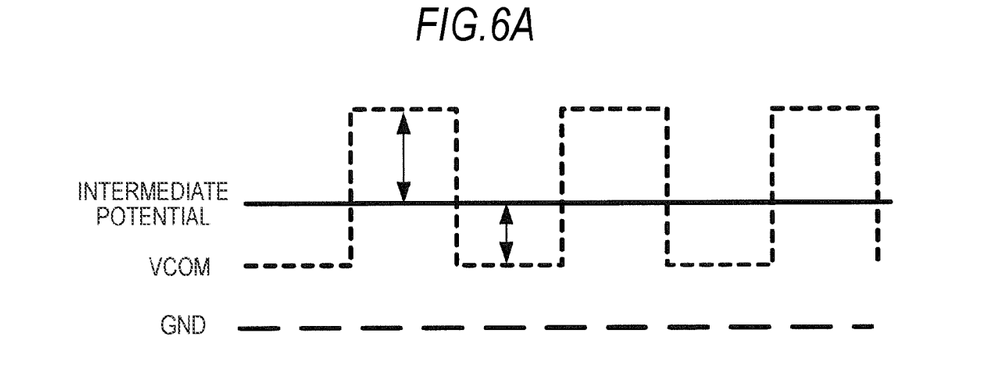
FIGS. 6A to 6C are diagrams for explaining a precharge potential applied to a detection wiring.
Figure 6B:
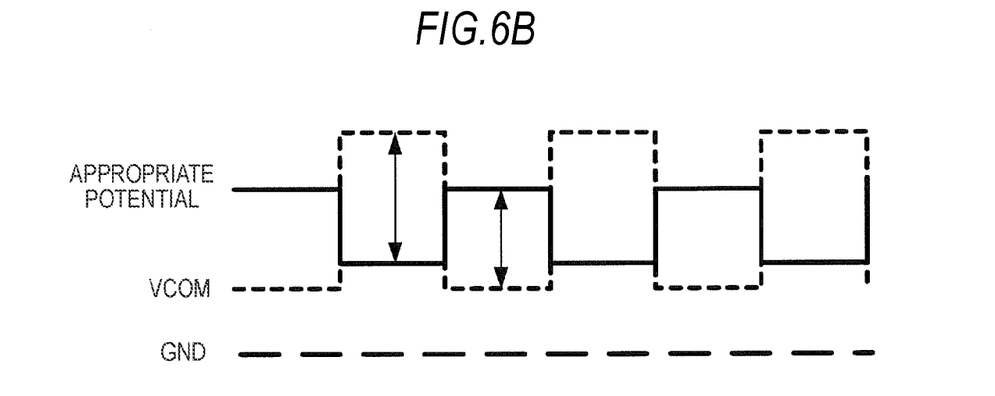

Displays have respective optimal values of the potential VCOM which are somewhat different from each other. Therefore, when an intermediate potential as shown in FIG. 6A or an appropriate potential as shown in FIG. 6B is used for precharging, the common potential has different potential differences from the precharging potential when it is at an H (high) level and when it is at an L (low) level. It is therefore necessary to provide a great margin for preventing erroneous detection, for example, in setting a threshold for detection of the presence of an external input, and such a margin may result in problems such as a reduction in the speed of response.

Figure 6C:
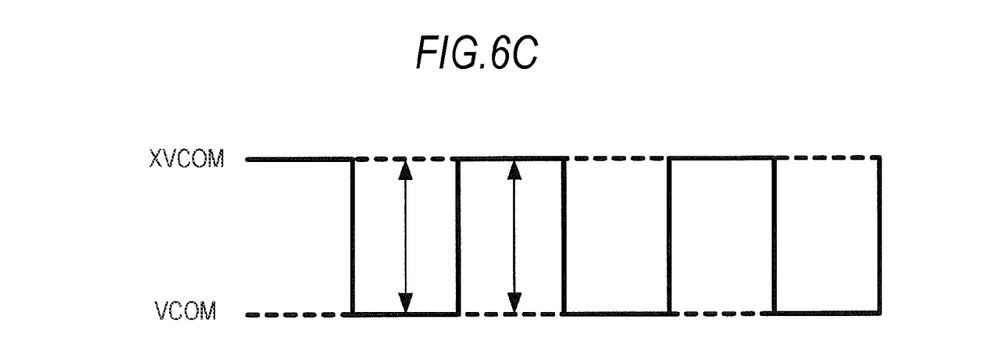

When the precharge potential is set at the potential XVCOM as shown in FIG. 6C, the potential difference between the potential at the detection electrode and the precharge potential can be kept constant regardless of the level (H or L level) of the potential at the common substrate. Thus, a detection system can be properly configured utilizing a precharge potential.

A wiring and an electrode for detection are therefore precharged to a known voltage before they are driven for detection, and contact detection can be performed easily and reliably by detecting a change in the voltage or current accurately.

The invention is not limited to the above-described embodiment, and it may be modified in various ways without departing from the spirit of the invention.

Figure 7A:
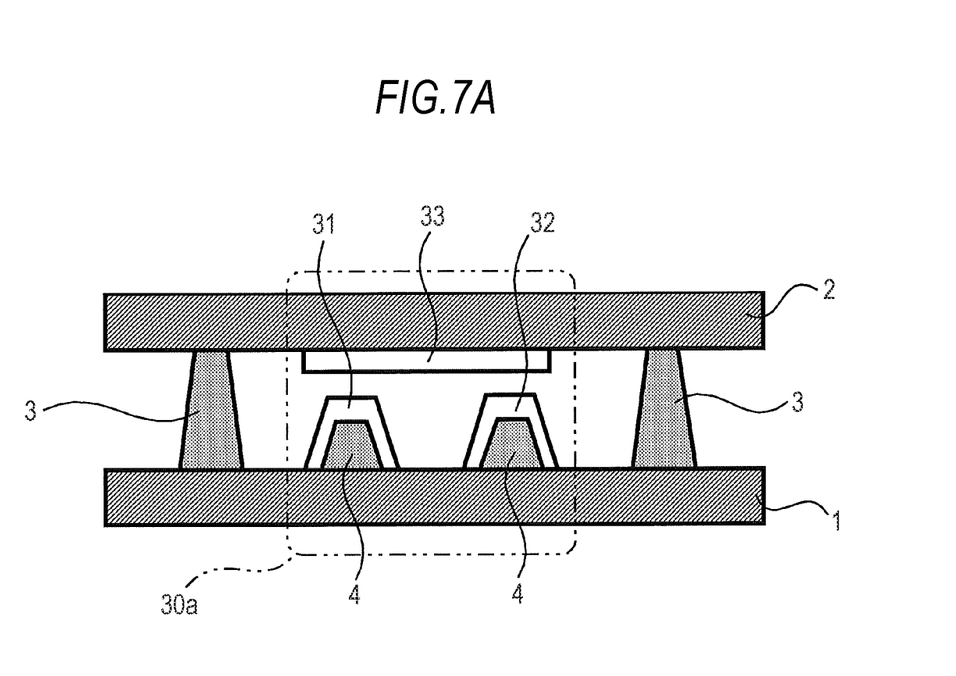
FIGS. 7A and 7B are sectional views for explaining a sensor structure.
Figure 7B:
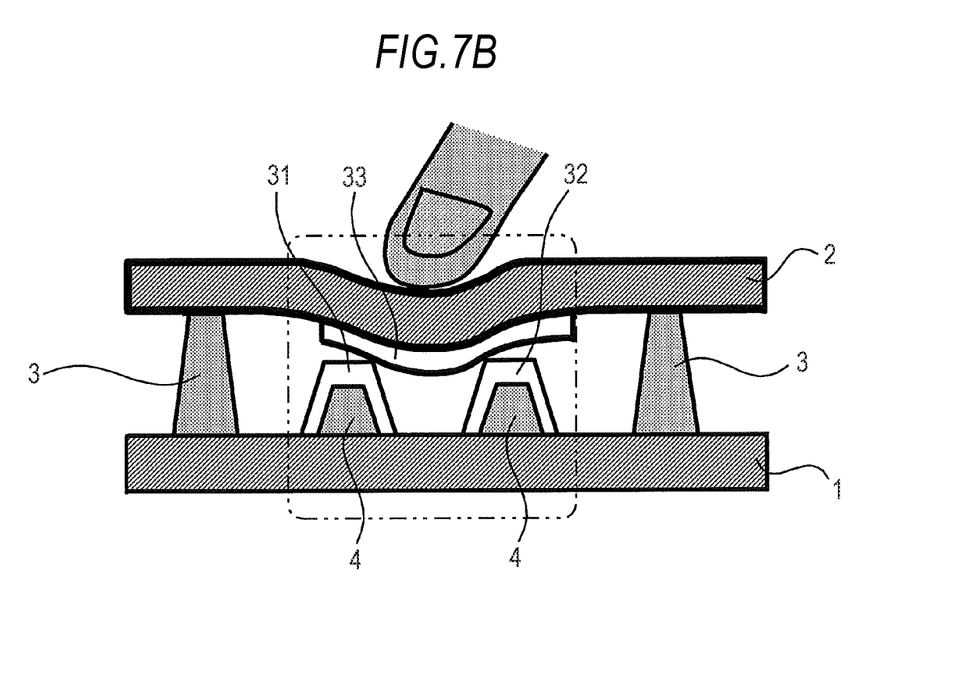

For example, a sensor structure (switch 30a) may be formed by three electrodes as shown in FIGS. 7A and 7B. Specifically, in this sensor structure, two protrusions 4 lower than the columns 3 are provided on the TFT substrate 1, and a conductive film is provided on the surface of each protrusion 4 to form one detection electrode 31 and another detection electrode 32. Patterning is performed on an opposite substrate 2 to form a conductor pattern 33.

Normally, the switch 30a having a sensor structure is kept in an open state by a gap between the two detection electrodes 31 and 32 on the TFT substrate 1 and the conductor pattern 33 on the opposite substrate 2.

As shown in FIG. 7B, when there is an input from outside (external input) in the form of a pressing force applied by a finger or stylus, the opposite substrate 2 is deflected by the pressing force. As a result, the conductor pattern 33 on the opposite substrate 2 is put in contact with the two detection electrodes 31 and 32 on the TFT substrate 1, and the switch 30a is closed consequently.

The present embodiment can be implemented in any configuration as long as it has a switch structure in which two detection electrodes 31 and 32 are electrically closed by an external input.

[Electronic Apparatus]

Figure 8:
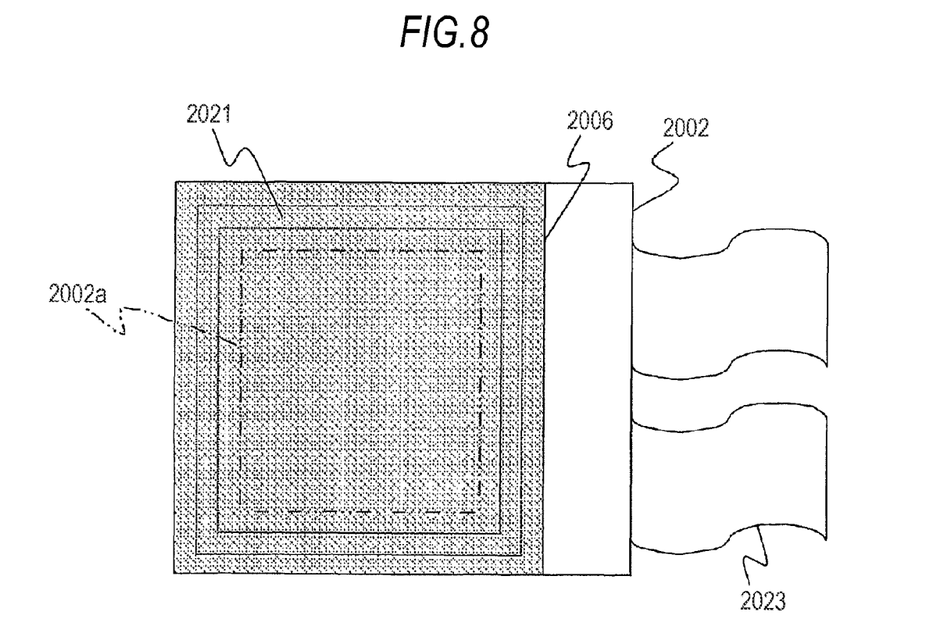
FIG. 8 is a schematic illustration showing an example of a configuration of a flat type module.

Displays according to the present embodiment include displays in the form of a flat type module as shown in FIG. 8. For example, pixels each including a liquid crystal element, a thin film transistor, a thin film capacity, and a light-receiving element are integrated in the form of a matrix on an insulated substrate 2002 to provide a pixel array section 2002a. An adhesive 2021 is applied around the pixel array section (pixel matrix section) 2002a to combine the substrate with an opposite substrate 2006 made of glass or the like, whereby a display module is provided. As occasion demands, color filters, a protection film, and a black matrix may be provided on the opposite substrate 2006 that is transparent. For example, the display module may include an FPC (flexible printed circuit) 2023 serving as a connector for inputting and outputting signals to and from the pixel array section 2002a from outside.

Displays according to the present embodiment as described above may be used as displays of various electronic apparatus as shown in FIGS. 9 to 13G, i.e., electronic apparatus in any field which display video signals input thereto or generated therein as images or pictures, such electronic apparatus including, for example, digital cameras, notebook type personal computers, portable terminals such as portable telephones, and video cameras. Examples of application of the present embodiment to electronic apparatus will be described below.

Figure 9:
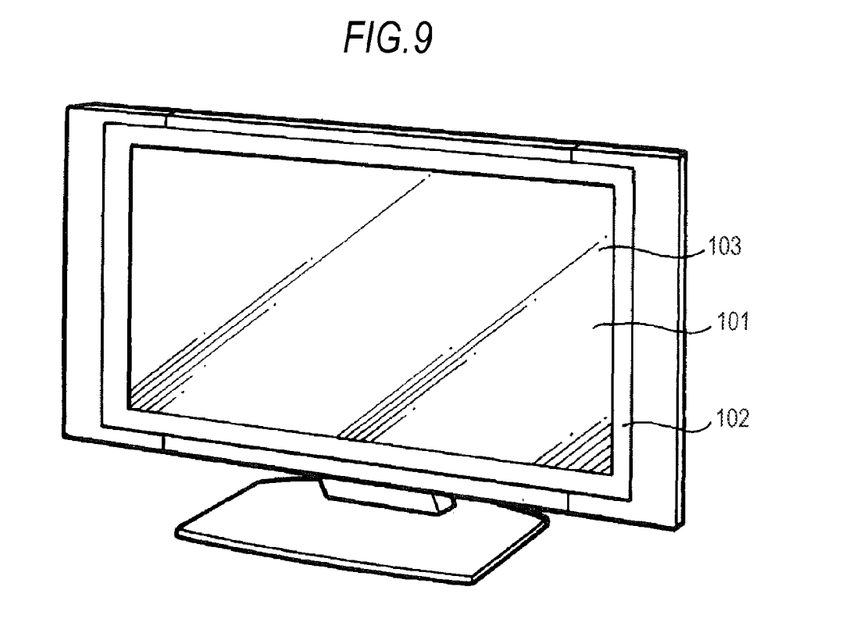
FIG. 9 is a perspective view of a television set employing the embodiment.

FIG. 9 is a perspective view of a television set employing the present embodiment. The television set of the this exemplary application includes a video display screen section 101 formed by a front panel 102, a filter glass 103, and so on, and a display according to the present embodiment is used as the video display screen section 101.

Figure 10A:
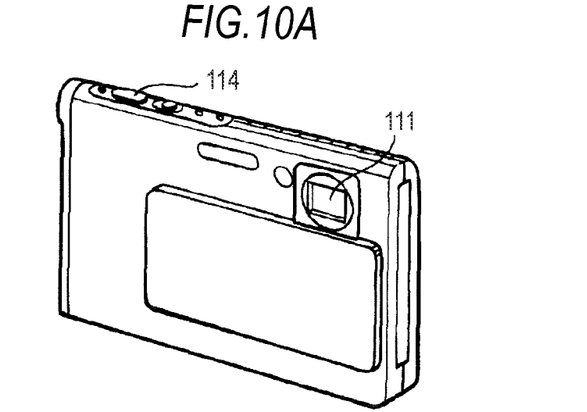
FIGS. 10A and 10B are perspective views of a digital camera employing the embodiment.
Figure 10B:
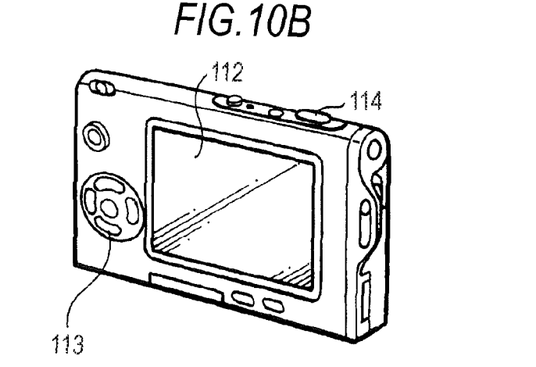

FIGS. 10A and 10B are perspective views of a digital camera employing the present embodiment. FIG. 10A is a perspective view of the camera taken from a front side of the same, and FIG. 10B is a perspective view of the camera taken from a rear side of the same. The digital camera of this exemplary application includes a light-emitting section 111 for flashing, a display section 112, a menu switch 113, and a shutter button 114, and a display according to the present embodiment is used as the display section 112.

Figure 11:
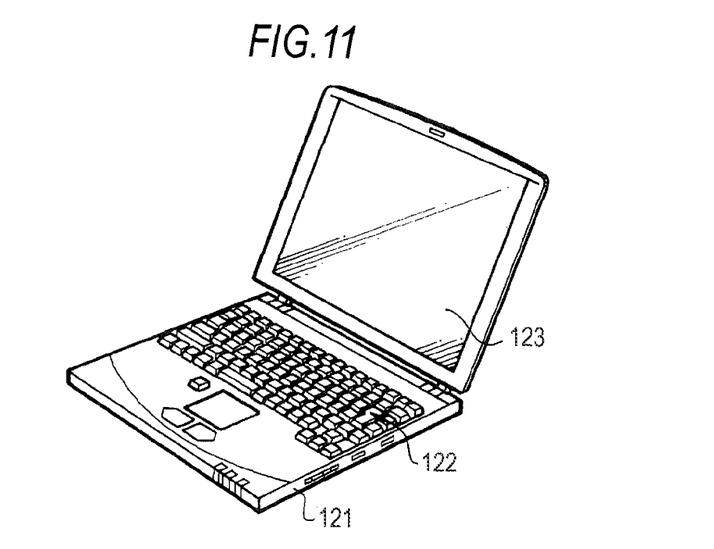
FIG. 11 is a perspective view of a notebook type personal computer employing the embodiment.

FIG. 11 is a perspective view of a notebook type personal computer employing the present embodiment. The notebook type personal computer of this exemplary application has a main body 121 including a keyboard 122 operated to input characters and etc. and a display section 123 for displaying images, and a display according to the present embodiment is used as the display section 123.

Figure 12:
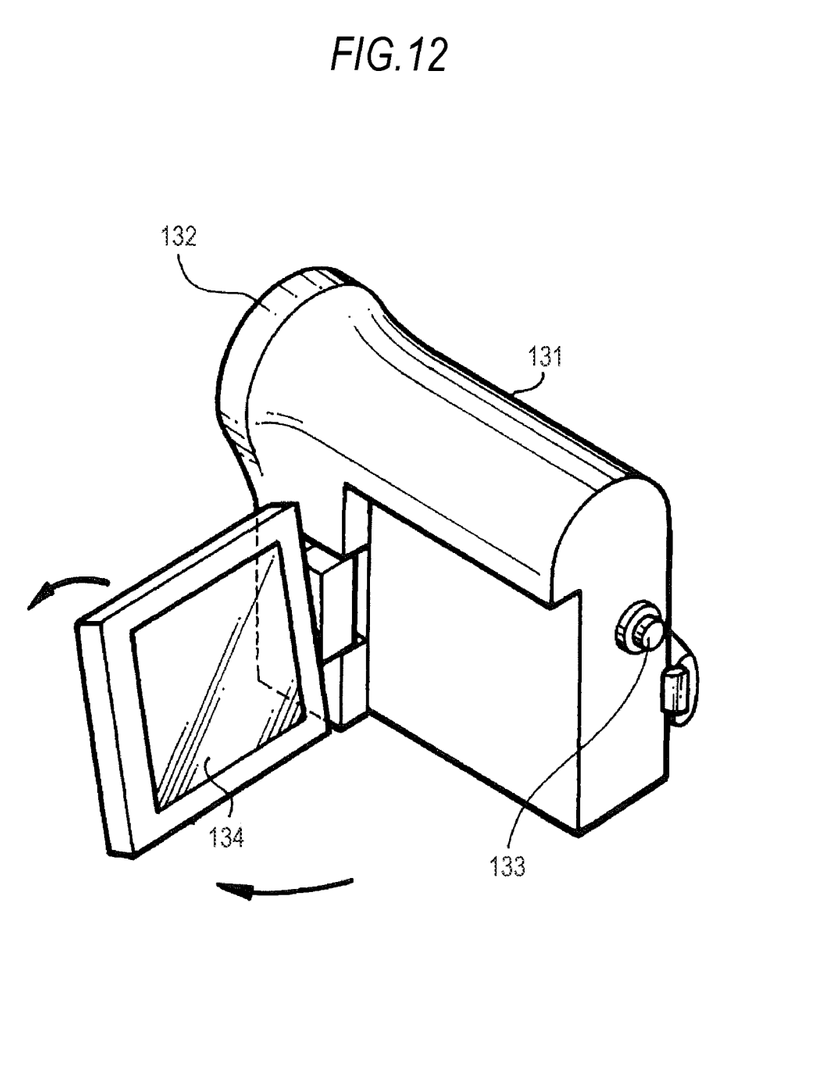
FIG. 12 is a perspective view of a video camera employing the embodiment.

FIG. 12 is a perspective view of a video camera employing the present embodiment. The video camera of this exemplary application includes a main body 131, a lens 132 for shooting an object provided on a front side of the camera, a shooting start/stop switch 133, and a display section 134, and a display according to the present embodiment is used as the display section 134.

Figures 13A, 13B:
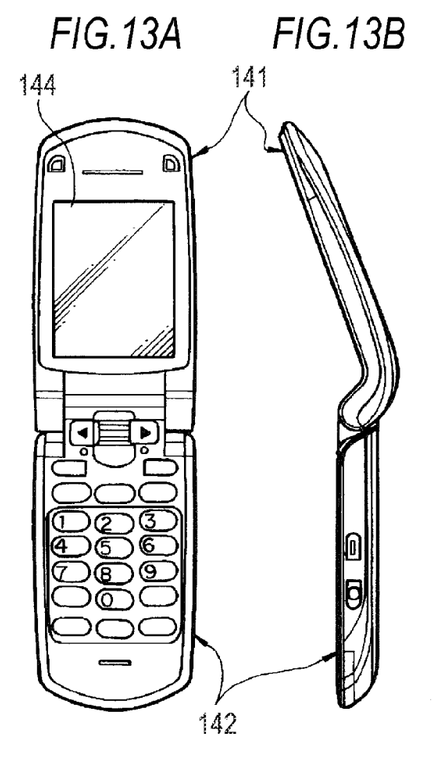
FIGS. 13A to 13G are illustrations of a portable telephone, which is an example of a portable terminal employing the embodiment.
Figures 13C, 13E, 13G:
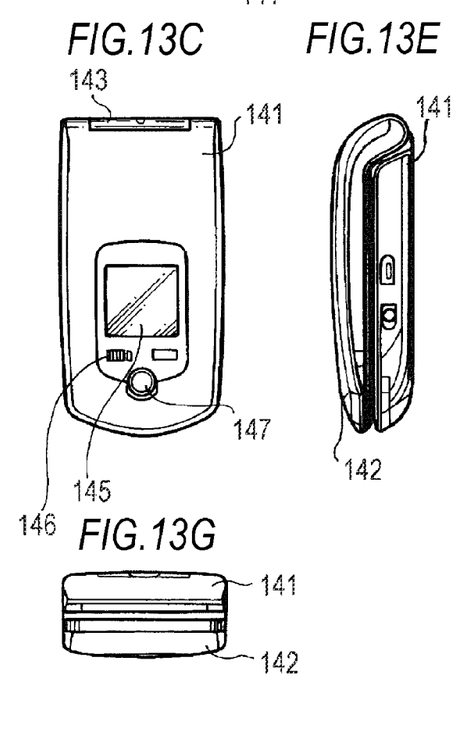
Figure 13D:
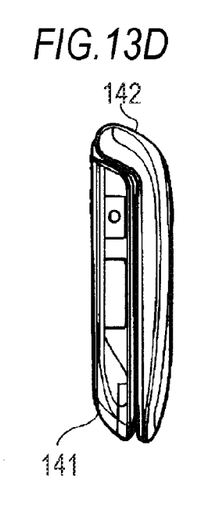
Figure 13F:
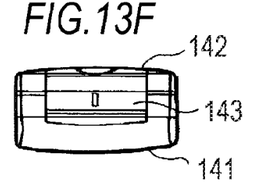

FIGS. 13A to 13G are illustrations of a portable terminal, specifically, a portable telephone employing the present embodiment. FIG. 13A is a front view of the terminal in an open state of the same. FIG. 13B is a side of the terminal. FIG. 13C is a front view of the terminal in a closed state of the same. FIG. 13D is a left side view of the terminal. FIG. 13E is a right side view of the terminal. FIG. 13F is a plan view of the terminal. FIG. 13G is a bottom view of the terminal. The portable telephone of this exemplary application includes a top housing 141, a bottom housing 142, a connecting section (specifically, a hinge section) 143, a display 144, a sub display 145, a picture light 146, and a camera 146, and displays according to the present embodiment are used as the display 144 and the sub display 145.

This embodiment of the invention has the following advantages. The state of the switches of the sensor structures can be detected with reference to an initial state of the switches which is clearly defined. Since all sensors therefore operate under the same condition, stable detection can be carried out.

The embodiment can be used in combination with general methods for detecting the presence or position of contact with a finger or stylus, and the embodiment is not limited to any particular detection method. Precharging to a known voltage prior to detection is advantageous in achieving stable detection and establishing a constant initial state also when using a method of detecting the position of an input to a sensor-integrated display such as an optical method.

Even when pixel electrodes and wirings for writing are also used for contact detection, stable detection can be performed without a need for paying attention to variations between potentials at the pixels. It is also possible to prevent erroneous detection occurring when a potential for writing a pixel agrees with a sensor output, and a detection circuit can therefore be simplified.

When there is no external input, since the precharge potential is maintained, the precharge potential can be also used for, for example, writing pixels, which is advantageous in achieving proper timing for writing at high definition.

When a detection electrode is disposed on the opposite substrate where a liquid crystal requiring no display electrode on the opposite substrate is used, the detection wiring can be disposed above the wirings on the TFT substrate to minimize the influence of the detection wiring on the transmittance and brightness of the display. It is further advantageous to set the potential at the detection electrode equal to the potential at the common electrode at this time.

The precharge potential may be set at a potential XVCOM associated with the common potential at the detection electrode on the opposite substrate (the potential XVCOM is opposite in phase to the common potential), which makes it possible to configure a detection system in which a threshold for detection is always set using the potential at the detection electrode on one side and the precharging potential.

Although the display in the above-described embodiment has been described as a liquid crystal display by way of example, the invention is not limited to liquid crystal displays, and it may be applied to display devices of other types such as plasma display devices and organic EL display devices. Although an embodiment having sensors (switches) for detecting an external input provided at pixels of a display section has been described above by way of example, the sensors may be disposed in regions between substrates other than a display section.

The present application contains subject matter related to that disclosed in Japanese Priority Patent Application JP 2008-312846 filed in the Japan Patent Office on Dec. 9, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
   first and second substrates disposed opposite each other;
   a display section having a plurality of pixels in a region where the first substrate and the second substrate are disposed opposite each other, each of the plurality of pixels having a first electrode and a second electrode;
   a switch in the region where the first substrate and the second substrate are disposed opposite each other, the switch having two electrodes placed in electrical communication by a pressure from outside the display to close the switch, one of the two electrodes of the switch connected to a data line;
   a detecting section configured to compare a signal from the switch with a reference signal to determine whether the switch is closed or not before writing data to a pixel of the display section through the data line, the signal obtained through the data line; and
   a precharge section configured to apply a precharge potential to a data line connected to one of the electrodes of the switch before writing data to the pixel of the display section through the data line,
   wherein,
      one of the electrodes of the switch is connected to (i) the first electrode of the pixel of the display section, and (ii) the data line through the first electrode,
      the other electrode of the switch is connected to the second electrode of the pixel, and
      the precharge potential is applied to the data line, the signal from the switch is compared to the reference signal, and the data is written to the pixel of the display section in this order.

2. A display according to claim 1, wherein a pixel electrode of a transistor for driving the pixel and one of the electrodes of the switch are connected to each other.

3. A display according to claim 1, wherein the precharge potential applied by the precharge section is a potential different from a common potential for displaying an image applied to the pixels.

4. A display according to claim 1, wherein the precharge potential applied by the precharge section is a potential which is opposite in phase to a common potential for displaying an image applied to the pixels.

5. A display according to claim 1, wherein the detecting section determines whether the switch is closed or not during a predetermined period other than a period for displaying an image at the pixels of the display section.

6. A display according to claim 1, wherein the two electrodes of the switch are on the first substrate and configured to be closed through a conductor pattern provided on the second substrate.

7. A display according to claim 1, wherein the switch is in the pixel of the display section.

8. A method of driving a display including a display section having a plurality of pixels in a region where a first substrate and a second substrate are disposed opposite to each other and a switch in the region where the first substrate and the second substrate are disposed opposite to each other, each of the plurality of pixels having a first electrode and a second electrode, the switch having two electrodes placed in electrical communication by a pressure from outside the display section to close the switch, one of the two electrodes of the switch connected to a data line, the method comprising the steps of:
   applying a precharge potential to the data line before writing data to a pixel of the display section through the data line; and
   determining whether the switch is closed or not during an on-period of a transistor for driving the pixel before writing the data to the pixel through the data line, the signal obtained through the data line,
   wherein,
      one of the electrodes of the switch is connected to (i) the first electrode of the pixel of the display section, and (ii) the data line through the first electrode, and
      the other electrode of the switch is connected to the second electrode of the pixel, and
      the precharge potential is applied to the data line, the signal from the switch is compared to the reference signal, and the data is written to the pixel of the display section in this order.

9. A method of driving a display according to claim 8, wherein the precharge potential is a potential different from a common potential applied to the pixel for displaying an image.

10. A method of driving a display according to claim 8, wherein the precharge potential is a potential which is opposite in phase to a common potential applied to the pixel for displaying an image.

11. An electronic apparatus comprising a display, wherein the display includes:
   first and second substrates disposed opposite each other;
   a display section having a plurality of pixels in a region where the first substrate and the second substrate are disposed opposite each other, each of the plurality of pixels having a first electrode and a second electrode;
   a switch in the region where the first substrate and the second substrate are disposed opposite each other, the switch having two electrodes placed in electrical communication by a pressure from outside the display to close the switch, one of the two electrodes of the switch connected to a data line;
   a detecting section configured to compare a signal from the switch with a reference signal to determine whether the switch is closed or not before writing data to a pixel of the display section through the data line, the signal obtained through the data line; and
   a precharge section configured to apply a precharge potential to the data line before writing data to the pixel of the display section through the data line,
   wherein,
      one of the electrodes of the switch is connected to (i) the first electrode of the pixel of the display section, and (ii) the data line through the first electrode,
      the other electrode of the switch is connected to the second electrode of the pixel, and
      the precharge potential is applied to the data line, the signal from the switch is compared to the reference signal, and the data is written to the pixel of the display section in this order.

* * * * *